United States Patent
Liles et al.

[11] Patent Number: 6,011,114
[45] Date of Patent: Jan. 4, 2000

[54] AQUEOUS EMULSIONS WHICH CROSSLINK BY MICHAEL ADDITION REACTIONS TO FORM SILICON MODIFIED ORGANIC COMPOSITIONS

[75] Inventors: Donald Taylor Liles, Midland, Mich.; David Logan Murray, Fall Branch, Tenn.

[73] Assignee: Dow Corning Corporation, Midland, Mich.

[21] Appl. No.: 08/677,053

[22] Filed: Jul. 9, 1996

[51] Int. Cl.⁷ .................................................. C08L 83/04
[52] U.S. Cl. ........................... 524/837; 524/862; 524/547
[58] Field of Search ................................ 524/837, 862, 524/547

[56] References Cited

U.S. PATENT DOCUMENTS

| | | |
|---|---|---|
| 3,449,293 | 6/1969 | Burzynski . |
| 3,575,910 | 4/1971 | Thomas . |
| 3,706,697 | 12/1972 | Backderf . |
| 3,729,438 | 4/1973 | Plesich . |
| 3,814,716 | 6/1974 | Kowalski . |
| 3,898,300 | 8/1975 | Hilliard . |
| 4,876,039 | 10/1989 | Lo et al. .................................. 264/4.7 |
| 5,214,095 | 5/1993 | Lavoie . |
| 5,306,744 | 4/1994 | Wolfersberger . |
| 5,449,716 | 9/1995 | Liles et al. .............................. 524/837 |

FOREIGN PATENT DOCUMENTS 59-6219  1/1984  Japan .

*Primary Examiner*—Jeffrey T. Smith
*Attorney, Agent, or Firm*—Patricia M. Scaduto

[57] ABSTRACT

An aqueous emulsion which crosslinks by a Michael addition reaction, yielding a crosslinked silicon modified organic composition upon removal of water has been prepared. The aqueous emulsion comprises the product formed by mixing a polymer containing at least two Michael acceptor groups per polymer molecule, water, a surfactant and an effective amount of a crosslinker containing sufficient reactive hydrogens of a Michael donor per crosslinker molecule or a precursor thereto. In order to obtain a crosslinked silicon modified organic composition upon the removal of water, the polymer or the crosslinker must contain at least one silicon atom. The invention also describes a method for making these emulsions.

23 Claims, No Drawings

AQUEOUS EMULSIONS WHICH CROSSLINK BY MICHAEL ADDITION REACTIONS TO FORM SILICON MODIFIED ORGANIC COMPOSITIONS

BACKGROUND OF THE INVENTION

1. Field of the Invention

This invention relates to an aqueous emulsion which crosslinks by a Michael addition reaction, yielding a crosslinked silicon modified organic composition upon the removal of water and to methods of preparing such emulsions.

2. Background Information

Environmental concerns are leading to changes in the technology for coatings. Of particular concern is the amount of volatile organic compounds (VOC) released into the atmosphere from coatings. In water-based coatings, volatile solvents are used to promote coalescence and film formation of latex particles. This is usually accomplished by preparing a dispersed polymer or copolymer having a Tg above room temperature and plasticizing it with a volatile solvent to effectively lower its Tg so it can form a film at room temperature. Evaporation of the solvent after film formation leaves a polymer that was in effect applied below its actual Tg; hence no external heating is required to achieve film formation. Although this concept works quite well, it is becoming increasingly less popular as the levels of VOC in coatings are being reduced significantly due to more stringent legislation throughout the world.

One method for overcoming this use of solvent is to crosslink emulsion polymers, preferably after removal of water. Crosslinking leads to increased mechanical properties of a polymer film and under the proper conditions it can lead to a reduction in the amounts of solvents used for coalescence and film formation. However, the choices available for crosslinking water-based coatings after removal of water are limited.

U.S. Pat. No. 3,729,438 discloses emulsion polymers containing siloxane functionality formed from copolymers of vinyl acetate and a vinyl hydrolyzable silane, such as for example, 3-methacryloxypropyltrimethoxysilane or vinyltrimethoxysilane (VTMS). These silanol modified organic polymers are disclosed as capable of post-crosslinking by means of the hydrolyzable siloxane functionality. It was attempted to retard premature condensation crosslinking through pH control of the aqueous emulsion within the range of pH 3.5 to 6.

U.S. Patent Application, Liles, et al, "Aqueous Emulsions of Functionalized Organic Polymers," Attorney Docket No. DC4398, filed concurrently herewith, describes another method of post-crosslinking the polymers. This method reacts silanol modified organic polymers prepared in a manner similar to that described in U.S. Pat. No. 3,729,438 with a hydrolyzable silane containing at least one group which is capable of further reaction, such as 3-acryloxypropylmethyldimethoxysilane, to form a functionalized organic emulsion polymer. If a photoinitiator is added to this functionalized organic emulsion polymer, it will crosslink in the presence of ultraviolet radiation.

Heretofore a method has not been disclosed for the preparation of aqueous emulsions which crosslink into silicon modified organic compositions by use of the Michael addition reaction. In preferred embodiments, this crosslinking may occur after application in the dry state. The resulting films are useful as coatings, paints and sealants.

An objective of this invention is to prepare aqueous emulsions which crosslink by a Michael addition reaction in either the wet or dry state.

Another objective of this invention is to prepare aqueous emulsions which yield crosslinked silicon modified organic compositions upon the removal of water and do not require an external stimulus in order to effect crosslinking.

SUMMARY OF INVENTION

The objectives of this invention can be achieved by preparing an aqueous emulsion which crosslinks by a Michael addition reaction, yielding a crosslinked silicon modified organic composition upon removal of water. The aqueous emulsion comprises the product formed by mixing a polymer containing at least two acceptor groups per polymer molecule, water, a surfactant and an effective amount of a crosslinker containing sufficient reactive hydrogens per crosslinker molecule or a precursor thereto. In order to obtain a crosslinked silicon modified organic composition upon the removal of water, the polymer or the crosslinker must contain at least one silicon atom.

The invention also describes a method for making these emulsions.

DETAILED DESCRIPTION OF THE INVENTION

This invention relates to an aqueous emulsion which crosslinks by a Michael addition reaction, yielding a crosslinked silicon modified organic composition upon removal of water, the emulsion comprising the product formed by mixing (A) a polymer selected from the group consisting of a modified organic polymer and a silicon modified organic polymer, each polymer molecule having at least 2 acceptor groups individually selected from the group consisting of $CH_2=CR^1COR^2-$, $CH_2=CR^1COOR^2-$, $CH_2=CR^1CONHR^2-$ and $CH_2=CR^1CR^1=CR^2-$, where $R^1$ is individually selected from the group consisting of hydrogen and monovalent, aliphatic hydrocarbon radicals having from 1 to 15 carbon atoms and $R^2$ is a divalent hydrocarbon radical having from 2 to 15 carbon atoms;

(B) water;

(C) a surfactant; and (D) an effective amount of a crosslinker selected from the group consisting of a silicon containing crosslinker and a non-silicon containing crosslinker, the crosslinker having sufficient reactive hydrogens per crosslinker molecule or a precursor thereto, the reactive hydrogens being covalently bonded to a nitrogen or sulfur atom of a donor group individually selected from the group consisting of —SH, —NH$_2$ and —NHR$^3$, where R$^3$ is a monovalent hydrocarbon radical having from 1 to 15 carbon atoms;

provided, the polymer or the crosslinker contains at least one silicon atom so that the emulsion yields a crosslinked silicon modified organic composition upon the removal of water.

The polymers useful in this invention are selected from the group consisting of modified organic polymers and silicon modified organic polymers. When the term "polymer" is used herein, it should be understood to describe polymers that may be homopolymeric, copolymeric and terpolymeric. The term "modified organic polymers" describes organic polymers, copolymers and terpolymers having acceptor groups pendant along the polymer chain. The term "silicon modified organic polymers" describes organic polymers, copolymers and terpolymers having acceptor groups pendant along the polymer chain which are bonded to the polymer through a siloxane bond.

The term "polymer" as used herein, also may include more than one type of modified organic polymer or silicon modified organic polymer or mixtures thereof. It is preferred, however, that the polymer comprise only a single type of modified organic polymer or silicon modified organic polymer. It is also preferred that the modified organic polymer and silicon modified organic polymers be copolymeric. Although not critical to this invention, the molecular weight of the polymer should be above 10,000 and preferably above 100,000.

Each polymer molecule must contain at least two acceptor groups individually selected from the group consisting of $CH_2=CR^1COR^2-$, $CH_2=CR^1COOR^2-$, $CH_2=CR^1CONHR^2-$ and $CH_2=CR^1CR^1=CR^2-$, where $R^1$ is individually selected from the group consisting of hydrogen and monovalent, aliphatic hydrocarbon radicals having from 1 to 15 carbon atoms and $R^2$ is a divalent hydrocarbon radical having from 2 to 15 carbon atoms.

Examples of suitable monovalent aliphatic hydrocarbon radicals represented by substituent $R^1$ include but are not limited to alkyl radicals such as methyl, ethyl, propyl, isopropyl, butyl, pentyl, isopentyl, neopentyl, hexyl, octyl, dodecyl, 3-methylheptyl, tertiary butyl, tetradecylene and 2,2-diethylpentyl and cycloaliphatic radicals such as cyclobutyl, cyclopentyl, cyclohexyl, or cycloheptyl, propylcyclohexyl and 2,4-dimethylcyclopentyl. $R^1$ is preferably hydrogen or methyl with hydrogen being more preferred.

Examples of suitable divalent hydrocarbon radicals represented by substituent $R^2$ include but are not limited to alkyl radicals such as ethylene, propylene, isopropylene, butylene, pentylene, isopentylene, neopentylene, hexylene, octylene, dodecylene, 3-methylheptylene, tertiary butylene, myricylene or 2,2-diethylpentylene; alkenyl radicals such as vinylene, allylene or hexenylene; alkynal radicals such as propargylene; cycloaliphatic radicals such as cyclobutylene, cyclopentylene, cyclohexylene, cycloheptylene, propylcyclohexylene, 2,4-dimethylcyclopentylene or cyclohexenylene; aromatic radicals such as phenylene, tolylene, xylylene, naphthylene or anthracylene and aralkyl radicals such as benzylene, beta-phenylethylene, beta-phenylpropylene or gamma-tolylpropylene. $R^2$ is preferably a propylene radical.

The preferred acceptor group is $CH_2=CR^1COOR^2-$ where $R^1$ is a methyl radical or hydrogen and $R^2$ is a propylene radical. More preferably $R^1$ is hydrogen. Although it is required to have at least two acceptor groups per polymer molecule, it is preferred that the amount of acceptor groups be between about 0.1 and 20 weight percent of the total weight of the polymer and most preferably the amount of acceptor groups should be between about 1 and 3 weight percent of the total weight of the polymer.

The polymers are preferably prepared in a manner that preserves the functionality of the acceptor groups. This is preferably done in a two or more step process such that a polymer having reactive groups is first formed and then the polymer is reacted with a compound having at least one acceptor group and at least one group capable of reacting with the reactive group on the polymer. This produces a polymer having acceptor groups pendant along the polymer chain.

One method of preparing the "modified organic polymers" is by reacting an organic monomer capable of undergoing free radical emulsion polymerization with an organic monomer containing acid functionality to form a copolymer having acid functionality. This acid functional copolymer can then be reacted with an organic monomer having a functional is group such as monoethylenically unsaturated epoxide compound, to form an organic copolymer having acceptor groups covalently bonded to such polymer. Examples of these monoethylenically unsaturated epoxide compounds include glycidyl(meth)acrylate, allyl glycidyl ether, glycidyl cinnamates, glycidyl crotonates, glycidyl itacrotonates, glycidyl norbornenyl. This method is described in more detail in U.S. Pat. No. 5,306,744 which is hereby incorporated by reference.

The preferred polymer is a silicon modified organic polymer. These silicon modified organic polymers are preferably prepared in two steps so the acceptor groups are not affected. The first step may be performed by emulsion copolymerization or by preforming the polymer outside of emulsion. Generally, an emulsion copolymerization is performed using one or more organic monomers capable of undergoing free radical initiated emulsion polymerization and a copolymerizable silane, a copolymerizable silazane or a copolymerizable siloxane in the presence of a surfactant and an initiator with stirring. As used herein, the term "copolymerizable silane" refers to silanes having a group capable of reacting with a monomer and at least one hydrolyzable group as defined herein. The terms "copolymerizable silazane" and "copolymerizable siloxane" refer to silazanes and siloxanes respectively, having a group capable of reacting with a monomer. The term "hydrolyzable" as used herein means a group attached to silicon which is hydrolyzed by water at room temperature. This copolymerization results in an organic polymer having silanol groups pendant from the polymer chain or a silanol modified organic polymer.

Illustrative examples of organic monomers useful for preparing both the modified organic polymers and the silicon modified organic polymers include vinyl acetate, styrene, a-methyl styrene, t-butyl styrene; acrylic esters such as ethyl acrylate, n-butyl acrylate, tertiary butyl acrylate, isobutyl acrylate, amyl acrylate, ethyl butyl acrylate, 2-ethylhexyl acrylate, octyl acrylate, nonyl acrylate, decyl acrylate, tridecyl acrylate, tetradecyl acrylate, hexadecyl acrylate, octadecyl acrylate and the corresponding methacrylic esters; acrylic acid and methacrylic acid.

Examples of the copolymerizable silanes are vinyltrimethoxysilane, vinyl-tris(2-methoxyethoxy)silane, methylvinyldimethoxysilane, methylvinyldiethoxysilane, dimethylvinylmethoxysilane, dimethylvinylethoxysilane, allyltrimethoxysilane, allylmethyldimethoxysilane, allyldimethylmethoxysilane, 3-methacryloxypropyltrimethoxysilane, 3-methacryloxypropylmethyldiethoxysilane and 3-methacryloxypropyldimethylethoxysilane.

Examples of copolymerizable silazanes include divinyltetramethyldisilazane, bis(3-methacryloxypropyldimethyl)disilazane and methylvinylcyclosilazanes.

Examples of copolymerizable siloxanes include divinyltetramethyldisiloxane, bis(3-methacryloxypropyldimethyl)disiloxane and methylvinylcyclosiloxanes.

The preparation of this silanol modified organic polymer is described in more detail in U.S. Pat Nos. 3,449,293; 3,575,910; 3,706,697; 3,729,438; 3,814,716; 3,898,300; 5,214,095 and U.S. application Ser. No. 552,022, Liles, et al., "Silicone/Organic Copolymer Emulsions," which are hereby incorporated by reference to show methods of forming the silanol modified organic polymers via emulsion polymerization. An artificial emulsion may also be prepared such that the silanol modified organic polymers are pre-formed and then emulsified as described in U.S. application Ser. No. 552,162, Joffre, et al, "Crosslinked Emulsions of Pre-Formed Silicon Modified Organic Polymers" and Japanese Patent 59-6219 which are hereby incorporated by reference.

After the silanol modified organic polymer is prepared, the silanol groups on the silanol modified organic polymers are then condensed with a hydrolyzable silane functionalized with at least one acceptor group, such as 3-acryloxypropylmethyldiethoxysilane or 3-methacryloxypropylmethyldiethoxysilane, in the presence of a tin catalyst such as stannous octoate or dibutyltindilaurate to form the silicon modified organic polymer. This second reaction can be conveniently performed in emulsion by adding the hydrolyzable silane functionalized with at least one acceptor group and tin catalyst to the emulsion containing the silanol functional organic polymer. A more thorough description of this method is provided in Liles, et al., "Aqueous Emulsions of Functionalized Organic Polymers U.S. patent application Ser. No. 08/677,054, filed concurrently herewith, which is hereby incorporated by reference.

In a preferred embodiment, the silanol modified organic polymer is prepared using a monohydrolyzable copolymerizable silane, copolymerizable silazane or copolymerizable siloxane as this generally leads to a predominantly non-crosslinked emulsion polymer. Further, it is also preferred that the silane functionalized with the acceptor group which is reacted with the silanol modified organic polymer to form the silicon modified organic polymer contain only two hydrolyzable groups because this also generally leads to a predominantly non-crosslinked polymer. This is very desirable as it enables one to crosslink the silicon modified organic polymer after the aqueous emulsion has been applied and dried.

The aqueous emulsion is in the form of an oil-in-water emulsion. Water comprises the continuous phase of the emulsion and is usually present in the amount of 20 to 80 weight percent by weight of the polymer. Preferably, the water is present in the amount of from 40 to 60 weight percent by weight of the polymer.

The term "surfactant" is meant to describe a surface active agent. Any conventional anionic or nonionic surfactant or mixtures thereof can be used in the aqueous dispersion of this invention. Such surfactants are well know in the art and can be found more fully enumerated in "Synthetic Detergents" by J. W. McCutcheon, published by MacNair-Dorland Company, New York. Illustrative examples of such surfactants are alkali metal and ammonium salts of long chain alkyl sulfates and sulfonates and the alkylene oxide condensates of long chain alcohols, fatty acids, and the like. Anionic surfactants are preferred, with TRITON X-200 (available from Union Carbide of Danbury, Conn.), which is an aqueous solution of an alkylaryl polyether sodium sulfonate being more preferred.

Generally, the amount of surfactant used should be that amount which stabilizes the dispersed phase of the emulsion. An amount of about 0.5 to 10 weight percent based on the weight of the polymer should be sufficient with 4 weight percent based on the weight of the polymer being preferred. Excess surfactant can detract from the properties of the crosslinked compound such as mechanical properties and moisture sensitivity.

The polymer is crosslinked using an effective amount of a crosslinker selected from the group consisting of a silicon containing crosslinker and a non-silicon containing crosslinker. The crosslinker comprises donor groups having sufficient reactive hydrogens per crosslinker molecule or a precursor thereto. The reactive hydrogens are covalently bonded to a nitrogen atom or a sulfur atom of a donor group elected from the group consisting of —SH, —$NH_2$, and —$NHR^3$, where $R^3$ is a monovalent hydrocarbon radical having from 1 to 15 carbon atoms.

A sufficient amount of reactive hydrogens is that amount which enables the crosslinker and polymers to form a crosslinked network. Generally, a sufficient amount of reactive hydrogens would be at least 2 or 3 reactive hydrogens per crosslinker molecule depending on the number of acceptor groups on each polymer molecule. If the polymer has 2 acceptor groups per molecule, for crosslinking to occur, the crosslinker must have at least 3 reactive hydrogens per crosslinker molecule. If the polymer has at least 3 acceptor groups per polymer molecule, for crosslinking to occur, the crosslinker only needs at least 2 reactive hydrogens per crosslinker molecule. Preferably, there are at least 3 reactive hydrogens per crosslinker molecule.

The precursor to a compound having sufficient reactive hydrogens can be any compound which is capable of forming in situ a compound containing sufficient reactive hydrogens. For example, $(MeO)_3Si(CH_2)_3SH$ only has 1 reactive hydrogen per molecule as defined herein. However, the methoxy groups on one molecule of $(MeO)_3Si(CH_2)_3SH$ can hydrolyze to form hydroxy groups and condense with hydroxy groups from other such hydrolyzed molecules, thereby providing a crosslinker molecule having multiple —SH groups and thus at least 2 or 3 reactive hydrogens.

The term "reactive hydrogen" as used herein describes each hydrogen which is covalently bonded to a nitrogen atom or sulfur atom of a donor group selected from the group described above. These reactive hydrogens are capable of reacting with acceptor groups on the polymer by a Michael addition. The term "donor group" as used herein describes a mercapto group —SH having 1 reactive hydrogen; a primary amino group —$NH_2$ having 2 reactive hydrogens; and a secondary amino group —$NHR^3$ having 1 reactive hydrogen, where $R^3$ is a monovalent hydrocarbon radical having from 1 to 15 carbon atoms.

$R^3$ radicals include alkyl radicals such as methyl, ethyl, propyl, isopropyl, butyl, pentyl, isopentyl, neopentyl, hexyl, octyl, dodecyl, 3-methylheptyl, tertiary butyl, myricyl or 2,2-diethylpentyl; alkenyl radicals such as vinyl, allyl or hexenyl; alkynal radicals such as propargyl; cycloaliphatic radicals such as cyclobutyl, cyclopentyl, cyclohexyl, cycloheptyl, propylcyclohexyl, 2,4-dimethylcyclopentyl or cyclohexenyl; aromatic radicals such as phenyl, tolyl, xylyl, naphthyl or anthracyl and aralkyl radicals such as benzyl, beta-phenylethyl, beta-phenylpropyl or gamma-tolylpropyl. $R^3$ is preferably methyl.

Examples of silicon containing crosslinkers include but are not limited to aminofunctional silanes and siloxanes such as $(MeO)_3Si(CH_2)_3NH(CH_2)_2NH_2$, $(EtO)_3Si(CH_2)_3NH_2$ and $H_2N(CH_2)_3(EtO)SiMe(OSiMe_2)_{0.95}(H_2N(CH_2)_3SiMeO)_{0.05}SiMe(OEt)(CH_2)_3NH_2$, a silicone fluid having a viscosity of about 1500 cs and a molar ratio of ($OSiMe_2$) to ($H_2N(CH_2)_3SiMeO$) of 0.95 to 0.05; mercaptofunctional silanes and siloxanes such as $(EtO)_2SiMe(CH_2)_3SH$ and $(MeO)_3Si(CH_2)_3SH$; in each case where Me and Et are methyl and ethyl, and siliconates having the formula $(M^+O^-)_mSi(OH)_{3-m}(R'NH_{2-a}R_a^3)$ or $(M^+O^-)_nSi(OH)_{2-n}(R'NH_{2-a}R_a^3)(R'')$, where M is individually selected from alkali metal cations, a phosphonium group or an ammonium group; R' is a divalent hydrocarbon radical having from 3 to 8 carbon atoms, one valence attached to the silicon atom and one valence attached to a $NH_{2-a}R_a^3$ group, where a is 0 or 1 and $R^3$ is a monovalent hydrocarbon radical having from 1 to 15 carbon atoms; R" is a monovalent hydrocarbon radical having 1 to 8 carbon atoms; m is a whole or fractional number from 0.1 to 3 and n is a whole or fractional number from 0.1 to 2.

Substituent M can be represented by the alkali metal cations lithium ($Li^+$), sodium ($Na^+$), potassium ($K^+$), cesium ($Cs^+$), rubidium ($Rb^+$) and the radicals $NR"_4^+$ and $PR"_4^+$ where R" is as defined above. Examples of substituent R" include but are not limited to alkyl radicals such as methyl, ethyl, propyl, isopropyl, butyl, pentyl, isopentyl, neopentyl, hexyl, octyl, 3-methylheptyl, tertiary butyl, or 2,2-diethylpentyl; alkenyl radicals such as vinyl, allyl or hexenyl; alkynal radicals such as propargyl; cycloaliphatic radicals such as cyclobutyl, cyclopentyl, cyclohexyl or cycloheptyl, or cyclohexenyl; aromatic radicals such as phenyl or tolyl and aralkyl radicals such as benzyl and beta-phenylethyl. R" is preferably methyl.

Preferred M substituents are $Na^+$ and $K^+$.

Examples of suitable divalent hydrocarbon radicals represented by substituent R' are the same as described above for $R^2$ except for the examples containing two carbon atoms and greater than 8 carbon atoms. R' is preferably a propylene group. More preferably R' is a propylene group and a from $NH_{2-a}R_a^3$ is 0.

Preferably, m and n are each 0.5 to 1.

Examples of siliconates include but are not limited to $NaOSi(OH)_2(CH_2)_3NH_2$, $NaO(OH)Si(CH_3)(CH_2)_3NH_2$, $KO_{0.5}(HO)_{1.5}Si(CH_3)(CH_2)_3NH_2$, $KOSi(OH)_2(CH_2)_3NH_2$, $LiO(OH)Si(CH_3)(CH_2)_3NH_2$, and $KO(HO)Si(CH_3)(CH_2)_3NH_2$.

Examples of non-silicon containing crosslinkers include but are not limited to multifunctional amino or mercapto compounds such as $H_2NCH_2CH_2NHCH_2CH_2NH_2$, $H_2NCHCH_3CH_2(OCH_2CHCH_3)_3-NH_2$, $CH_3CH_2C(CH_2OCH_2CHCH_3NH_2)_3$, 1,2-ethanedithiol, 1,6-hexanedithiol and trithiocyanuric acid.

Silicon containing crosslinkers are preferred. More preferred crosslinkers are siliconates having the formula $(M^+O^-)_nSi(OH)_{2-n}(R'NH_{2-a}R_a^3)R"$ where M is $Na^+$ or $K^+$, R' is a propylene group, a is 0, R" is methyl and n is 0.5 to 1, $(CH_3O)_2SiCH_3(CH_2)_3SH$ and $H_2NCHCH_3CH_2(OCH_2CHCH_3)_3NH_2$ with $NaO(OH)Si(CH_3)(CH_2)_3NH_2$ being most preferred.

An effective amount of crosslinker is that amount which provides the needed number of reactive hydrogens for reacting with the acceptor groups of the polymer to yield a crosslinked silicon modified organic composition upon the removal of water. Since the crosslinking occurs by a Michael addition reaction of reactive hydrogens to the acceptor groups of the polymer, what constitutes an effective amount of crosslinker depends on the amount of reactive hydrogens on each crosslinker molecule and the amount of acceptor groups on the polymer. Generally, the crosslinker should be added in an amount which provides at least a stoichiometric equivalent of reactive hydrogens relative to the acceptor groups on the polymer. As used herein, "stoichiometric equivalent" means the number of reactive hydrogens is the same as the number of acceptor groups. Preferably, enough crosslinker should be added such that there is a stoichiometric excess of reactive hydrogens relative to the acceptor groups on the polymer. Having a stoichiometric excess will assure that crosslinking proceeds at a practical rate. By "stoichiometric excess" it is meant that the number of reactive hydrogens provided by the crosslinker is greater than the number of acceptor groups on the polymer. Most preferably, enough crosslinker should be added such that there is about a 2 to 10 fold stoichiometric excess of reactive hydrogens relative to the acceptor groups on the polymer.

The crosslinker may be added neat, in solution or as a second dispersed phase separate from the dispersed phase containing the polymer which has been emulsified by conventional methods. If the polymer is preformed prior to emulsification, the crosslinker may be emulsified with the preformed polymer. It is preferred to add the crosslinker neat or in solution to the water phase after the polymer has been emulsified. The time of addition of the crosslinker and whether added neat, in solution or as a second dispersed phase separate from the dispersed phase containing the polymer, may affect when crosslinking of the polymer occurs.

The crosslinker may be added as a single species of either a silicon containing crosslinker or a non-silicon containing crosslinker, or as a mixture of two or more different species of silicon containing crosslinker or non-silicon containing crosslinker, or as a mixture of one or more silicon containing crosslinkers and non-silicon containing crosslinkers. The aqueous emulsion of this invention yields a crosslinked silicon modified organic composition upon removal of water. Therefore, if the polymer is a "modified organic polymer," at least one molecule of the crosslinker must be a silicon containing crosslinker in order to form a silicon modified organic composition. The crosslinkers are commercially available or can be made by known methods.

It may be useful to add a filler and other ingredients to the emulsion depending on the properties desired and the specific use for the crosslinked composition. Examples of filler are silica, calcium carbonate and kaolin clay. Other ingredients include pigments, thickeners, rheology modifiers, defoamers, adhesion promoters and preservatives. The order of addition of these ingredients is not critical, but usually these additives are incorporated in the emulsion after the polymer has been formed.

The particle size of the emulsion does not limit the scope of the present invention as the Michael addition reactions occur without regard to particle size. However, particle size should be such that the emulsion remains stable for a useful length of time, which is usually on the order of several years. Particle sizes of 80 to 1000 nm typically provide this degree of emulsion stability.

The composition of this invention may be formed by emulsifying water, a surfactant, a polymer and a crosslinker at the same time. In this embodiment, crosslinking will likely begin immediately, forming an emulsion comprising a dispersed phase comprising a crosslinked product of the polymer and crosslinker. If the crosslinker is added to the continuous water phase or as a second dispersed phase separate from the dispersed phase containing the polymer, after emulsification of the polymer with water and surfactant, the dispersed phase comprises the polymer and crosslinking may not occur until the water in the emulsion is removed.

In a preferred method of forming the emulsion, the crosslinker is added neat or in solution to the continuous water phase of the emulsified polymer or as a second dispersed phase separate from the dispersed phase containing the polymer.

In a more preferred method of forming the emulsion, a silicon modified organic polymer is formed in emulsion and then a silicon containing crosslinker is added neat or in solution to the continuous water phase or as a second dispersed phase separate from the dispersed phase containing the silicon modified organic polymer.

Removing the water from the emulsion yields a crosslinked silicon modified organic composition. The water may be removed by evaporation or other conventional methods. The water will evaporate at ambient temperatures, however, elevated temperatures may also be used to remove the water at a faster rate. The crosslinked silicone modified organic composition can find use as a coating material or as a sealant.

An aqueous emulsion which yields a crosslinked silicone modified organic composition upon the removal of water and does not require an external stimulus in order to effect crosslinking has been prepared. This preparation was achieved by utilizing groups that are unaffected by water and can be kept separate until the water is removed.

EXAMPLES

The following examples are presented for illustrative purposes and should not be construed as limiting the present invention which is delineated in the claims.

Example 1

In a flask was added 758 g of deionized (DI) water, 72.9 g of a 28 percent aqueous solution of an alkyl aryl polyether sodium sulfonate (TRITON® X-200), 3.75 g of ammonium persulfate and 3.0 g of sodium bicarbonate. The contents of the flask were stirred for 30 min at room temperature while a nitrogen purge was maintained. 225 g of inhibitor-free ethyl acrylate (prepared by passing 725 g of ethyl acrylate through a bed of ion exchange resin) was added to the flask all at once, stirring was maintained and heating was started. Approximately 30 min later, when the temperature reached 54°C., an exotherm occurred and heating was stopped. When a temperature maximum was obtained (90.5°C.) approximately 30 min later, heat was again applied to the flask. After about 20 min, the temperature had stabilized at 70°C. and an additional 225 g of the ethyl acrylate was added dropwise over a 1 hr period while the temperature was maintained at 70°C. Next a solution of 4.39 g vinyldimethylethoxysilane in 225 g of ethyl acrylate was added to the flask dropwise also over a 1.5 hr period. After all of the feed solution had been added, the emulsion was heated with stirring for 60 min at 70°C. The emulsion was allowed to cool to room temperature with stirring. The contents of the flask was filtered through a 149 mm polypropylene filter and later heated to 50°C. for 30 min in vacuo using a rotary evaporator. 5 g of material remained in the filter and 103 g of condensate was collected in the evaporator receiver. The recovered emulsion weighed 1351.2 g and it had a non-volatile content of 49.4 percent by weight. The emulsion had a mean particle size of 168 nm and 99 percent of the particles were less than 250 nm, as determined by light scattering (NIACOMP®). This latex consisted of an emulsion of poly(ethylacrylate) containing approximately 0.5 mole percent units derived from vinyldimethylethoxysilane.

Films were cast by pouring 8 g of emulsion into 100 mm diameter polystyrene Petri dishes that had been previously coated with a thin film of silicone grease. The latex films were allowed to dry at ambient conditions for 7 days prior to tensile testing. Tensile properties of the latex film were determined (INSTRON®) and are provided in Table 1. The film was soluble in ethyl acetate.

Example 2

100 g of the silane modified latex from Example 1 was weighed into a jar. 0.25 g of stannous bis(2-ethylhexanoate) (stannous octoate) was added to the emulsion dropwise with stirring. The emulsion was stirred for 2 min after which 0.5 g of 3-acryloxypropylmethyldimethoxysilane was added dropwise with stirring. The latex was stirred 5 more min after all of the silane had been added. This latex consisted of an approximately 50 percent solids emulsion of polyethylacrylate/0.5 mole percent vinyldimethylethoxysilane copolymer containing 0.5 parts Sn (II) octoate and 1.0 parts 3-acryloxypropylmethyldimethoxysilane based on polymer weight. This latex was now essentially an emulsion of polyethylacrylate having acryl functionality. After remaining 24 hr at ambient conditions, a film was cast from the latex and the film was allowed to dry at ambient conditions for 7 days. Tensile properties of the acryl functional polyethylacrylate latex film were determined and they are provided in Table 1. This film was soluble in ethyl acetate.

Example 3

An aqueous solution of sodium 3-aminopropylmethylsiliconate was prepared by adding dropwise with stirring, 15 g of 3-aminopropylmethyldiethoxysilane to a solution of sodium hydroxide that was prepared by adding 42 g of 2N sodium hydroxide to 43 g of deionized water. This solution corresponded to an approximately 15 percent by weight solids solution of the sodium siliconate: $NaO(OH)SiCH_3(CH_2)_3NH_2$.

50 g of the acryl functional polyethylacrylate latex described in Example 2 was weighed into a jar equipped with a mechanical stirrer. 2 g of the aqueous sodium 3-aminopropylmethylsiliconate solution was added dropwise with stirring to the latex. Stirring was continued for 5 min after all of the siliconate solution had been added. A film of this mixture was cast and allowed to dry at ambient conditions for 7 days after which it was examined and found to be elastomeric and insoluble in ethyl acetate. Tensile properties and swelling properties in ethyl acetate were determined and are provided in Table 1.

Example 4

To 100 g of the acryl functional polyethylacrylate latex described in Example 2 was added 4 g of a 15% aqueous solution of the polyoxyalkyleneamine $H_2NCHMeCH_2(OCH_2CHMe)_3NH_2$ (JEFFAMINE® D-230) dropwise with stirring. Stirring was continued for 10 min after all of the solution had been added. Films were cast as described above and the films were allowed to dry at ambient conditions for 7 days after which they were examined and found to be elastomeric. Tensile properties and swelling properties in ethyl acetate were determined and are provided in Table 1.

Example 5

To 100 g of the acryl functional polyethylacrylate latex described in Example 2 was added 0.5 g of 3-mercaptopropyltrimethoxysilane dropwise with stirring. Stirring was continued for 15 min after all of the silane had been added. Films were cast from this composition as described above and allowed to dry under ambient conditions for 7 days. The films were inspected and found to be elastomeric. Tensile properties and swelling properties in ethyl acetate were determined and are provided in Table 1.

Example 6

(a) Following the same procedure as that described in Example 1, a latex of poly(ethylacrylate) was prepared without using any silane. In this preparation, an initial flask charge consisted of 758 g DI water, 72.9 g TRITON® X-200, 3.75 g $(NH_4)_2S_2O_8$ and 3.0 g $NaHCO_3$. The ethyl acrylate was added in two parts, an initial part (seed) of 225 g followed by a dropwise addition of 450 g. After the preparation of this latex was complete following the procedure of Example 1, the contents of the reaction flask were filtered through a 149 mm polypropylene filter and later heated to 50°C. for 30 min in vacuo using a rotary evaporator. <3 g of coagulum remained on the filter and 34 g of condensate was collected in the evaporator receiver. The recovered emulsion weighed 1416 g and it had a non-volatile content of 49.6 percent by weight. The emulsion had a mean particle size of 197.7 nm with 99 percent of the particles less than 453 nm as determined by light scattering (NIACOMP®). The emulsion had a viscosity of 18.5 Cp (18.5 mPa s) as determined using a BROOKFIELD® viscometer.

Films of this latex were cast using the procedure of Example 1 and allowed to dry under ambient conditions for 7 days after which they were examined and found to be non-elastomeric. The films were also soluble in ethyl acetate. Tensile properties are provided in Table 1.

(b) To 50 g of the above emulsion was added with stirring 2 g of the sodium 3-aminopropylsiliconate solution described in Example 3. The latex was stirred for 10 min after addition of the siliconate solution. Films were cast from the latex and they were allowed to dry under ambient conditions for 7 days after which they were examined and tested. The films were found to be only very slightly crosslinked. Although they were insoluble in ethyl acetate, the percent gel was quite low for an elastomer. Tensile and swelling properties are provided in Table 1.

TABLE 1

| Example | Cross-linker | % Swell | % Gel | Yield Stress psi (MPa) | % Elong. | Stress @ 100% Elong psi (MPa) |
|---|---|---|---|---|---|---|
| 6(a) | none | dissolved | dissolved | 43(0.3) | 1032 | 19(0.13) |
| 6(b) | a | 5455 | 32.5 | 94(0.65) | 1707 | 26(0.18) |
| 1 | none | dissolved | dissolved | 57(0.4) | 1498 | 20(0.14) |
| 2 | none | dissolved | dissolved | 41(0.3) | 1336 | 9(0.06) |
| 3 | a | 2235 | 73.6 | 481(3.3) | 1434 | 22(0.15) |
| 4 | b | 2945 | 70.3 | 441(3.0) | 1517 | 31(0.21) |
| 5 | c | 2900 | 67.2 | 272(1.9) | 866 | 36(0.25) | a - $NaO(OH)SiCH_3(CH_2)_3NH_2$
b - $H_2NCHMeCH_2(OCH_2CHMe)_3NH_2$
c - $(MeO)_3Si(CH_2)_3SH$

We claim:

1. An aqueous emulsion, yielding a crosslinked silicon modified organic composition upon removal of water, the emulsion comprising a product formed by mixing (A) a polymer selected from the group consisting of a modified organic polymer and a silicon modified organic polymer, each polymer molecule having at least 2 acceptor groups individually selected from the group consisting of $CH_2=CR^1COR^2—$, $CH_2=CR^1COOR^2—$, $CH_2=CR^1CONHR^2—$ and $CH_2=CR^1CR^1=CR^2—$, where $R^1$ is individually selected from the group consisting of hydrogen and monovalent, aliphatic hydrocarbon radicals having from 1 to 15 carbon atoms and $R^2$ is a divalent hydrocarbon radical having from 2 to 15 carbon atoms;

(B) water;

(C) a surfactant; and (D) an effective amount of a crosslinker selected from the group consisting of a silicon containing crosslinker and a non-silicon containing crosslinker, the crosslinker having sufficient reactive hydrogens per crosslinker molecule or a precursor thereto, the reactive hydrogens being covalently bonded to a nitrogen or sulfur atom of a donor group selected from the group consisting of —SH, —$NH_2$ and —$NHR^3$, where $R^3$ is a monovalent hydrocarbon radical having from 1 to 15 carbon atoms;

provided, the polymer or the crosslinker contains at least one silicon atom so that the emulsion yields a crosslinked silicon modified organic composition upon the removal of water.

2. The emulsion of claim 1, wherein the polymer is a silicon modified organic polymer and the effective amount of crosslinker is an amount providing at least a stoichiometric equivalent of reactive hydrogens relative to the acceptor groups on the polymer.

3. The emulsion of claim 2, wherein the silicon modified organic polymer is formed by copolymerizing an organic monomer and a copolymerizable silane, a copolymerizable silazane or a copolymerizable siloxane so that an organic polymer having silanol groups pendant along the polymer chain is produced and then condensing the silanol groups with a hydrolyzable silane functionalized with at least one acceptor group in the presence of a tin catalyst forming an organic polymer having acceptor groups pendant along the polymer chain which are bonded to the polymer through a siloxane bond; and the crosslinker is a silicon containing compound.

4. The emulsion of claim 3, wherein 0.1 to 20% by weight of the polymer comprises acceptor groups having the formula $CH_2=CR^1COOR^2—$ where $R^1$ is hydrogen or a methyl radical and $R^2$ is a propylene radical; the crosslinker is selected from the group consisting of siliconates having the formula $(M^+O^-)_mSi(OH)_{3-m}(R'NH_{2-a}R_a^3)$ or $(M^+O^-)_nSi(OH)_{2-n}(R'NH_{2-a}R_a^3)R''$, where M is individually selected from alkali metal cations, a phosphonium group or an ammonium group, R' is a divalent hydrocarbon radical having from 3 to 8 carbon atoms, one valence attached to the silicon atom and one valence attached to a $NH_{2-a}R_a^3$ group, where a is 0 or 1 and $R^3$ is a monovalent hydrocarbon radical having from 1 to 15 carbon atoms; R'' is a monovalent hydrocarbon radical having 1 to 8 carbon atoms; m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; and the effective amount of crosslinker is an amount providing a stoichiometric excess of reactive hydrogens relative to the acceptor groups on the polymer.

5. The emulsion of claim 4, wherein $R^1$ of the acceptor group is hydrogen and the crosslinker is selected from the group consisting of a siliconate having the formula $(M^+O^-)_nSi(OH)_{2-n}(R'NH_{2-a}R_a^3)R''$, where M is $Na^+$ or $K^+$, R' is a propylene group, a is 0, R'' is a methyl radical and n is from 0.5 to 1, $(CH_3O)_2SiCH_3(CH_2)_3SH$ and $H_2NCHCH_3CH_2(OCH_2CHCH_3)_3NH_2$.

6. The emulsion of claim 5, wherein the crosslinker is $NaO(OH)SiCH_3(CH_2)_3NH_2$; the acceptor groups comprise 1 to 3 percent by weight of the polymer and the effective amount of crosslinker is an amount providing about a 2 to 10 fold stoichiometric excess of reactive hydrogens relative to the acceptor groups on the polymer.

7. The emulsion of claim 6 and further comprising a filler.

8. An aqueous emulsion, yielding a crosslinked silicon modified organic composition upon removal of water, comprising:

(A) a dispersed phase comprising a polymer selected from the group consisting of a modified organic polymer and a silicon modified organic polymer, each polymer molecule having at least 2 acceptor groups individually selected from the group consisting of $CH_2=CR^1COR^2-$, $CH_2=CR^1COOR^2-$, $CH_2=CR^1CONHR^2-$ and $CH_2=CR^1CR^1=CR^2-$, where $R^1$ is individually selected from the group consisting of hydrogen and monovalent, aliphatic hydrocarbon radicals having from 1 to 15 carbon atoms and $R^2$ is a divalent hydrocarbon radical having from 2 to 15 carbon atoms;

(B) a continuous water phase;

(C) a surfactant; and (D) an effective amount of a crosslinker selected from the group consisting of a silicon containing crosslinker and a non-silicon containing crosslinker, the crosslinker having sufficient reactive hydrogens per crosslinker molecule or a precursor thereto, the reactive hydrogens being covalently bonded to a nitrogen or sulfur atom of a donor group individually selected from the group consisting of $-SH$, $-NH_2$ and $-NHR^3$, where $R^3$ is a monovalent hydrocarbon radical having from 1 to 15 carbon atoms, the crosslinker being present in the continuous water phase or as a second dispersed phase separate from the dispersed phase containing the polymer;

provided, the polymer or the crosslinker contains at least one silicon atom so that the emulsion yields a cured silicon modified organic composition upon the removal of water.

9. The emulsion of claim 8, wherein the polymer is a silicon modified organic polymer; the crosslinker is present in the continuous water phase and the effective amount of crosslinker is an amount providing at least a stoichiometric equivalent of reactive hydrogens relative to the acceptor groups on the polymer.

10. The emulsion of claim 9, wherein the silicon modified organic polymer is formed by copolymerizing an organic monomer and a copolymerizable silane, a copolymerizable silazane or a copolymerizable siloxane so that an organic polymer having silanol groups pendant along the polymer chain is produced and then condensing the silanol groups with a hydrolyzable silane functionalized with at least one acceptor group in the presence of a tin catalyst forming an organic polymer having acceptor groups pendant along the polymer chain which are bonded to the polymer through a siloxane bond; and the crosslinker is a silicon containing compound.

11. The emulsion of claim 10, wherein 0.1 to 20% by weight of the polymer comprises acceptor groups having the formula $CH_2=CR^1COOR^2-$ where $R^1$ is hydrogen or a methyl radical and $R^2$ is a propylene radical; the crosslinker is selected from the group consisting of siliconates having the formula $(M^+O^-)_m Si(OH)_{3-m}(R'NH_{2-a}R_a^3)$ or $(M^+O^-)_n Si(OH)_{2-n}(R'NH_{2-a}R_a^3)R''$, where M is individually selected from alkali metal cations, a phosphonium group or an ammonium group, R' is a divalent hydrocarbon radical having from 3 to 8 carbon atoms, one valence attached to the silicon atom and one valence attached to a $NH_{2-a}R_a^3$ group, where a is 0 or 1 and $R^3$ is a monovalent hydrocarbon radical having from 1 to 15 carbon atoms; R'' is a monovalent hydrocarbon radical having 1 to 8 carbon atoms; m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; and the effective amount of crosslinker is an amount providing a stoichiometric excess of reactive hydrogens relative to the acceptor groups on the polymer.

12. The emulsion of claim 11, wherein $R^1$ of the acceptor group is hydrogen and the crosslinker is selected from the group consisting of a siliconate having the formula $(M^+O^-)_n Si(OH)_{2-n}(R'NH_{2-a}R_a^3)R''$, where M is $Na^+$ or $K^+$, R' is a propylene group, a is 0, R'' is a methyl radical and n is from 0.5 to 1, $(CH_3O)_2SiCH_3(CH_2)_3SH$ and $H_2NCHCH_3CH_2(OCH_2CHCH_3)_3NH_2$.

13. The emulsion of claim 12, wherein the crosslinker is $NaO(OH)SiCH_3(CH_2)_3NH_2$; the acceptor groups comprise 1 to 3 percent by weight of the polymer and the effective amount of crosslinker is an amount providing about a 2 to 10 fold stoichiometric excess of reactive hydrogens relative to the acceptor groups on the polymer.

14. The emulsion of claim 13 and further comprising a filler.

15. A method of preparing an aqueous emulsion, yielding a crosslinked silicon modified organic composition upon removal of water, comprising the step of mixing an emulsion containing:

(A) a dispersed phase comprising a polymer selected from the group consisting of a modified organic polymer and a silicon modified organic polymer, each polymer molecule having at least 2 acceptor groups individually selected from the group consisting of $CH_2=CR^1COR^2-$, $CH_2=CR^1COOR^2-$, $CH_2=CR^1CONHR^2-$ and $CH_2=CR^1CR^1=CR^2-$, where $R^1$ is individually selected from the group consisting of hydrogen and monovalent, aliphatic hydrocarbon radicals having from 1 to 15 carbon atoms and $R^2$ is a divalent hydrocarbon radical having from 2 to 15 carbon atoms;

(B) a continuous water phase; and (C) a surfactant; with an effective amount of a crosslinker selected from the group consisting of a silicon containing crosslinker and a non-silicon containing crosslinker, the crosslinker having sufficient reactive hydrogens per crosslinker molecule or a precursor thereto, the reactive hydrogens being covalently bonded to a nitrogen or sulfur atom of a donor group individually selected from the group consisting of $-SH$, $-NH_2$ and $-NHR^3$, where $R^3$ is a monovalent hydrocarbon radical having from 1 to 15 carbon atoms, the crosslinker being present in the continuous water phase or as a second dispersed phase separate from the dispersed phase containing the polymer;

provided, the polymer or the crosslinker contains at least one silicon atom so that the emulsion yields a cured silicon modified organic composition upon the removal of water.

16. The method of claim 15, wherein the polymer is a silicon modified organic polymer; the crosslinker is present in the continuous water phase and the effective amount of crosslinker is an amount providing at least a stoichiometric equivalent of reactive hydrogens relative to the acceptor groups on the polymer.

17. The method of claim 16, wherein the silicon modified organic polymer is formed by copolymerizing an organic monomer and a copolymerizable silane, a copolymerizable silazane or a copolymerizable siloxane so that an organic polymer having silanol groups pendant along the polymer chain is produced and then condensing the silanol groups with a hydrolyzable silane functionalized with at least one acceptor group in the presence of a tin catalyst forming an organic polymer having acceptor groups pendant along the polymer chain which are bonded to the polymer through a siloxane bond; and the crosslinker is a silicon containing compound.

18. The method of claim 17, wherein 0.1 to 20% by weight of the polymer comprises acceptor groups having the formula $CH_2=CR^1COOR^2-$ where $R^1$ is hydrogen or a methyl radical and $R^2$ is a propylene radical; the crosslinker is selected from the group consisting of siliconates having the formula $(M^+O^-)_mSi(OH)_{3-m}(R'NH_{2-a}R_a^3)$ or $(M^+O^-)_nSi(OH)_{2-n}(R'NH_{2-a}R_a^3)R''$, where M is individually selected from alkali metal cations, a phosphonium group or an ammonium group, R' is a divalent hydrocarbon radical having from 3 to 8 carbon atoms, one valence attached to the silicon atom and one valence attached to a $NH_{2-a}R_a^3$ group, where a is 0 or 1 and $R^3$ is a monovalent hydrocarbon radical having from 1 to 15 carbon atoms; R" is a monovalent hydrocarbon radical having 1 to 8 carbon atoms; m is a whole or fractional number from 0.1 to 3 and n is a whole or fractional number from 0.1 to 2, $(CH_3O)_2SiCH_3(CH_2)_3SH$ and $H_2NCHCH_3CH_2(OCH_2CHCH_3)_3NH_2$; and the effective amount of crosslinker is an amount providing a stoichiometric excess of reactive hydrogens relative to the acceptor groups on the polymer.

19. The method of claim 18, wherein $R^1$ of the acceptor group is hydrogen and the crosslinker is selected from the group consisting of a siliconate having the formula $(M^+O^-)_nSi(OH)_{2-n}(R'NH_{2-a}R_a^3)R''$, where M is $Na^+$ or $K^+$, R' is a propylene group, a is 0, R" is a methyl radical and n is from 0.5 to 1, $(CH_3O)_2SiCH_3(CH_2)_3SH$ and $H_2NCHCH_3CH_2(OCH_2CHCH_3)_3NH_2$.

20. The method of claim 19, wherein the crosslinker is $NaO(OH)SiCH_3(CH_2)_3NH_2$; the acceptor groups comprise 1 to 3 percent by weight of the polymer and the effective amount of crosslinker is an amount providing about a 2 to 10 fold stoichiometric excess of reactive hydrogens relative to the acceptor groups on the polymer.

21. The method of claim 20 and further comprising the step of adding a filler.

22. The method of claim 20 and further comprising the step of removing the water.

23. The composition prepared by the method of claim 22.

* * * * *